US012649604B2

(12) United States Patent
Schroll et al.

(10) Patent No.: US 12,649,604 B2
(45) Date of Patent: Jun. 9, 2026

(54) LABELLING UNIT AND METHOD FOR APPLYING LABELS TO CONTAINERS

(71) Applicant: Krones AG, Neutraubling (DE)

(72) Inventors: Bernd Schroll, Kulmain (DE); Johannes Strauss, Wolfsegg (DE); Christian Holzer, Schierling (DE)

(73) Assignee: Krones AG, Neutraubling (DE)

( * ) Notice: Subject to any disclaimer, the term of this patent is extended or adjusted under 35 U.S.C. 154(b) by 120 days.

(21) Appl. No.: 18/562,246

(22) PCT Filed: Apr. 22, 2022

(86) PCT No.: PCT/EP2022/060684
§ 371 (c)(1),
(2) Date: Nov. 17, 2023

(87) PCT Pub. No.: WO2022/242985
PCT Pub. Date: Nov. 24, 2022

(65) Prior Publication Data

US 2025/0083855 A1 Mar. 13, 2025

(30) Foreign Application Priority Data

May 18, 2021 (DE) ..................... 10 2021 112 852.8

(51) Int. Cl.
*B32B 41/00* (2006.01)
*B65C 9/18* (2006.01)

(52) U.S. Cl.
CPC ..................................... *B65C 9/18* (2013.01)

(58) Field of Classification Search
CPC .......... B65C 9/18; B65C 9/1803; B32B 41/00
(Continued)

(56) References Cited

U.S. PATENT DOCUMENTS

| | | | |
|---|---|---|---|
| 4,844,962 | A | 7/1989 | May et al. |
| 2013/0001349 | A1 | 1/2013 | Pedercini et al. |
| 2019/0322403 | A1 | 10/2019 | Strauss et al. |

FOREIGN PATENT DOCUMENTS

| | | | |
|---|---|---|---|
| AT | E34720 | T1 | 6/1988 |
| CN | 202170038 | U | 3/2012 |

(Continued)

OTHER PUBLICATIONS

Search Report dated Jan. 10, 2022, in connection with German Application No. 10 2021 112 852.8, 10 pages.

(Continued)

*Primary Examiner* — Michael N Orlando
*Assistant Examiner* — Joshel Rivera

(57) ABSTRACT

A labeling unit and a method for applying labels to containers are described. According thereto, the labeling unit comprises an unwinding device for unwinding a label-backing tape from at least one supply reel, a processing device for separating the label-backing tape into the individual labels and for transferring the labels onto the containers, and, arranged in-between, a loop buffer which is variable in size and is intended for temporarily storing the label-backing tape. Owing to the fact that the loop buffer comprises at least two, pivotably-mounted for changing the size, deflecting pulleys for the label-backing tape, and is designed and arranged to provide the sole, temporary storage between the supply reel and the separation unit, the label-backing tape can be temporarily stored with comparatively high storage dynamics and sufficiently high storage capacity for changing the label-backing tape, and also with a low outlay on an apparatus.

20 Claims, 5 Drawing Sheets

(58) Field of Classification Search
USPC .................... 156/60, 64, 350, 351, 378, 379
See application file for complete search history.

(56) References Cited

FOREIGN PATENT DOCUMENTS

| | | | |
|---|---|---|---|
| CN | 102602574 | A | 7/2012 |
| DE | 4027247 | A1 | 8/1991 |
| DE | 19523088 | A1 | 1/1996 |
| DE | 19646732 | A1 | 5/1998 |
| DE | 69525271 | T2 | 10/2002 |
| DE | 10204313 | B4 | 2/2006 |
| DE | 102013215999 | A1 | 2/2015 |
| EP | 0796794 | A1 | 9/1997 |
| JP | 2012121679 | A | 6/2012 |
| WO | 2018114077 | A1 | 6/2018 |
| WO | 2019121152 | A1 | 6/2019 |

OTHER PUBLICATIONS

International Search Report and Written Opinion of the International Searching Authority dated Sep. 5, 2022, in connection with International Application No. PCT/EP2022/060684, 18 pages.
First Office Action dated Sep. 26, 2025, in connection with Chinese Application No. 202280035821.1, 17 pages.

LABELLING UNIT AND METHOD FOR APPLYING LABELS TO CONTAINERS

CROSS-REFERENCE TO RELATED APPLICATIONS

This application is a 371 National Stage of International Application No. PCT/EP2022/060684, filed Apr. 22, 2022, which claims priority to German Patent Application No. 102021112852.8, filed May 18, 2021, the disclosures of which are incorporated herein by reference.

TECHNICAL FIELD

The invention relates to a labeling unit and to a method for applying labels to containers.

BACKGROUND

As is known, labeling units are used in labeling machines for transferring labels onto containers, such as bottles or cans, for example. The labeling machines usually comprise a container carousel on which the containers to be labeled circulate on container plates so as to rotate in place, and are thus transported through the transfer region of the labeling unit. An associated labeling unit then comprises an unwinding device with two supply reels for unwinding a label-backing tape from one of the supply reels, a conveyor for advancing the label-backing tape, and a processing device by means of which the label-backing tape is separated into labels—for example, at a cutting unit. These are there optionally coated with glue and finally transferred to the containers.

Furthermore, such labeling units generally comprise an intermediate buffer unit arranged between the supply reel and the processing unit, which can compensate for production fluctuations of the labeling machine, and which enables an uninterrupted transport of the label-backing tape if the end of a label-backing tape unwound from one of the supply reels is connected to the beginning of the label-backing tape of the other supply reel.

Particularly in the case of machine blocks having such labeling machines, and with further machines arranged upstream or downstream without intermediate buffering for the production and/or processing of the containers, additional requirements arise for the temporary storage of the label-backing tape used for the compensation for position gaps in the container stream to be labeled or during rapid start-up or shutdown of the labeling unit in cooperation with other machines of the machine block.

Since relatively high forces act upon the label-backing tape when the conveying unit of the labeling unit is abruptly started up or braked, errors may arise during its processing, e.g., during separation or gluing, or the label-backing tape can be damaged. Further disturbances of the labeling unit or other components of the labeling machine can accordingly also be triggered.

To remedy this problem, WO 2018/114077 A1 proposes—in addition to a linear temporary storage arranged directly downstream of the supply reels—arranging a loop buffer which reacts dynamically thereto in which the label-backing tape is guided around two stationary deflecting pulleys and around one deflecting pulley mounted movably on a pivoting lever, so as to alter the size. In simplified terms, the linear buffer is then designed in terms of its capacity such that label-backing tapes can be connected to one another during an ongoing labeling operation, while the loop buffer is to dynamically compensate correspondingly for abrupt accelerations and slow-downs during transport of the label-backing tape.

However, such a configuration has the disadvantage that the linear temporary storage and the dynamic loop buffer influence one another during operation. As a result, strip tensions generated in the linear temporary storage also act upon the dynamic loop buffer, such that the latter works, for example, with preloads of 40 to 50 N in blocked machines, and of approximately 20 to 30 N in non-blocked labeling machines. As a result, strip tensions of about 7 to 8 N or 4 to 5 N are obtained in the linear temporary storage in an embodiment with, for example, 6 label-backing tape strands.

Depending upon the type of the label-backing tape, e.g., depending upon its width, the label-backing tapes can be damaged in the case of such strip tensions. Therefore, if the strip tension has to be reduced specifically and/or in a format-specific manner, the dynamic loop buffer can no longer be operated in the optimal working range. This means that the strip tensions still possible may be insufficient for reliable buffer operation for the accelerations and slow-downs that arise.

It is also disadvantageous that the linear temporary storage and the dynamic loop buffer must be designed differently depending upon the use in a machine block or in non-blocked labeling machines, which causes additional design complexity and introduces error sources in the construction, installation, startup, and control.

There is therefore a need for an improved labeling unit and method.

SUMMARY

The stated object is achieved by a labeling unit and by a method.

The labeling unit accordingly serves to apply labels to containers, such as bottles made of glass or plastic. For this purpose, the labeling unit comprises an unwinding device for unwinding a label-backing tape from at least one supply reel, a processing device for separating the label-backing tape into the labels and for transferring them to the containers, and, arranged in-between, a variable loop buffer for temporarily storing the label-backing tape.

According to the invention, the loop buffer comprises at least two, pivotably-mounted for changing the size, deflecting pulleys for the label-backing tape, wherein the loop buffer is designed and arranged to provide the sole, temporary storage between the supply reel and the separation unit. This means that the labeling unit is designed in such a way that the label-backing tape length guided between the supply reel and the separation unit is changed exclusively in the loop buffer, i.e., without an additional linear temporary storage for the label-backing tape.

It has surprisingly been found that the mounting of at least two deflecting pulleys on at least one pivoting lever satisfies both the requirements for the storage capacity during the label-backing tape change and the storage dynamics required in a machine block when accelerating or decelerating the label-backing tape. Thus, no additional linear temporary storage is required directly following the unwinding device.

The pivotably-mounted deflecting pulleys then work together with stationarily-mounted deflecting pulleys to form strands/loops of the label-backing tape. The loop buffer preferably comprises one more stationary deflecting pulley than pivotably-mounted deflecting pulleys.

The deflecting pulleys are preferably mounted on the same pivoting lever. This allows a mounting of the deflecting pulleys with comparatively lower mass inertia in the case of changes in the size of the loop buffers.

Preferably, the deflecting pulleys have a diameter of at most 20 mm. Such deflecting pulleys have a comparatively low mass inertia, so that a rapid reaction of the loop buffer to accelerations or slow-downs of the label-backing tape, to create strip tensions that are not damaging to the label-backing tape, is possible.

Preferably, the pivoting lever is adjustably preloaded by means of at least one spring, and in particular a spiral spring. This enables a simple mechanical adaptation of the preload of the loop buffer, and thus of the resulting strip tension, to the requirements of the labeling process, according to the use in a machine block or in a non-blocked labeling machine, and with regard to different types of label-backing tapes.

Preferably, the spring is coupled to a ratchet to increase the preload in the loop buffer in steps. This enables, for operators, a simple adjustment of the preload with a predetermined gradation.

Preferably, the loop buffer is designed to adjust a strip tension applied therein per strand of the label-backing tape in the range of 1 to 5 N, and in particular 2 to 4 N. In this way, it is possible to meet the requirements for abrupt accelerations or slow-downs of the label-backing tape without damage to the tape.

The loop buffer preferably comprises a position encoder for determining the actual storage size. As a result, it can be ensured, for example, that the loop buffer is sufficiently filled with label-backing tape prior to a connection of label-backing tapes to be carried out, so that the loop buffer can be emptied during the connection/splicing of the label-backing tapes while continuously providing the label-backing tape.

The loop buffer preferably has a storage capacity for a label-backing tape length of at least one meter. A correspondingly filled loop buffer then allows label-backing tapes to be connected to the loop buffer during continued belt conveyance.

The labeling unit according to at least one of the described embodiments is, for example, a component of a labeling unit with a container carousel transporting the containers, and in particular bottles, in the label transfer station.

The labeling machine is then, for example, a component of a machine block, which comprises at least one machine upstream or downstream of the labeling machine, without intermediate buffering, for container production or container processing. The arrangement of the loop buffer in such a machine block is particularly advantageous, due to the comparatively nimble storage dynamics of the loop buffer in case of abrupt changes in the conveying speed of the label-backing tape, in conjunction with other machines of the machine block.

The method described serves to apply labels to containers—in particular, in the labeling unit according to at least one of the described embodiments. Accordingly, a label-backing tape is unwound from a supply reel, stored temporarily in a variable loop buffer, and then separated into labels and transferred to the containers in this form.

According to the invention, the label-backing tape is guided in the loop buffer around at least two, pivotably-mounted for changing the size, deflecting pulleys, wherein the label-backing tape length guided between the given supply reel and the separation unit is changed exclusively in the loop buffer.

A pivotable bearing means that the deflecting pulleys are mounted on has at least one pivoting lever and can be moved with respect to stationarily-mounted deflecting pulleys of the loop buffer.

Preferably, the strip tension per strand of the label-backing tape in the loop buffer is set by spring preloading to a value between 1 and 5 N, and in particular between 2 and 4 N.

Preferably, a label-backing tape length conveyed for separation during the splicing of the label-backing tape, i.e., during the connection to a further label-backing tape, is kept available exclusively in the loop buffer. This means that the loop buffer is filled with label-backing tape before splicing/connecting, in that the pivotably-mounted deflecting pulleys are moved away from associated stationary deflecting pulleys. During subsequent feed-out of the label-backing tape from the loop buffer by a reverse pivoting movement, the label-backing tape can be stopped long enough upstream of the loop buffer to produce the connection to another label-backing tape.

The labels are preferably attached to the containers within a machine block, wherein the labels are attached with the method according to at least one of the described embodiments, and the containers to be labeled are transported from an upstream container-production or container-processing machine, and/or the labeled containers are transported to a downstream container-processing machine, without temporary storage. The storage dynamics required for this can be managed with the described loop buffer, with a low space requirement and with sufficient storage capacity for splicing.

BRIEF DESCRIPTION OF THE DRAWINGS

A preferred embodiment of the invention is illustrated in the drawing. In the figures.

DETAILED DESCRIPTION

Figure 1:
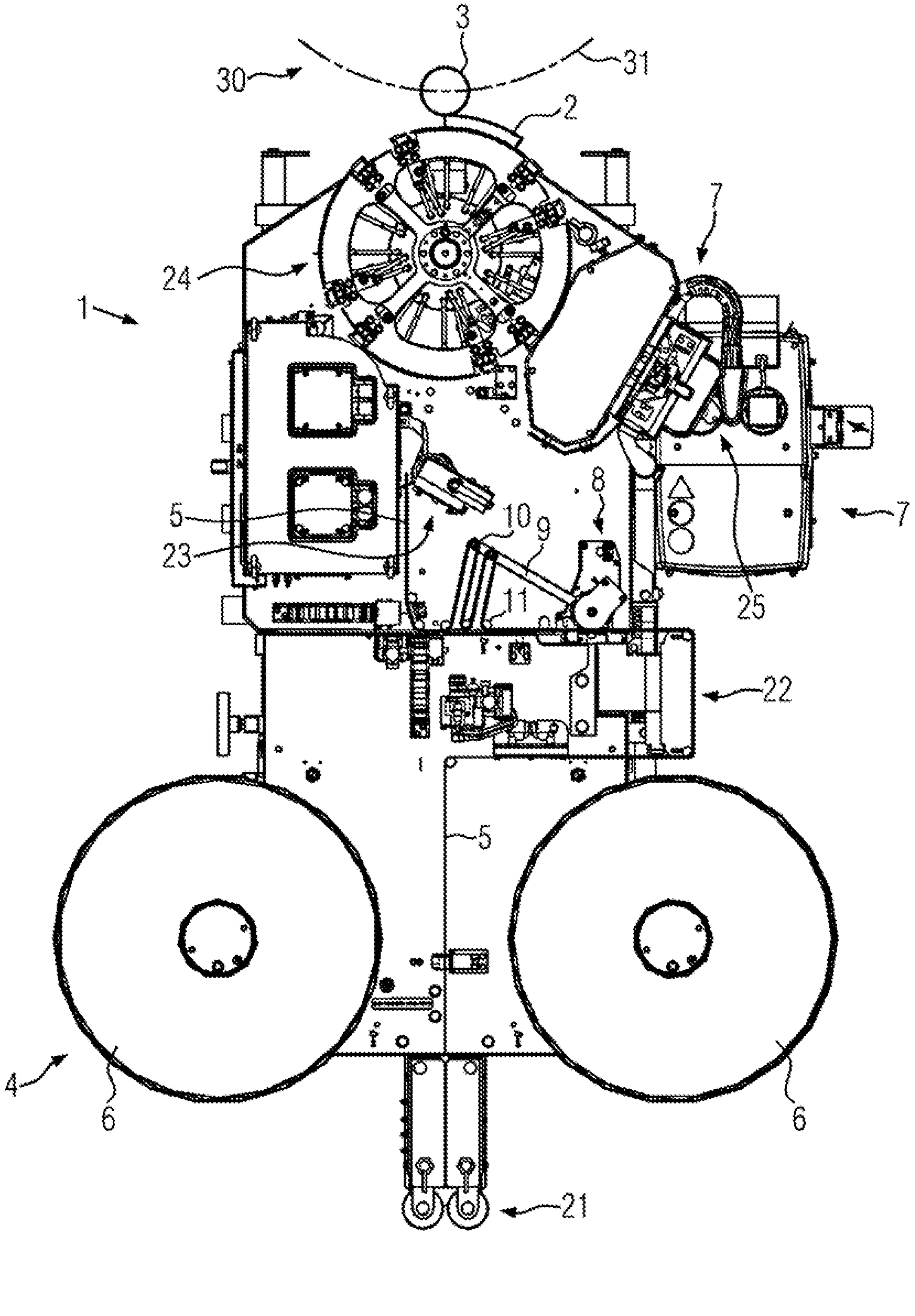
FIG. 1 is a plan view of the labeling unit.

As can be seen from FIG. 1, the labeling unit 1 for applying labels 2 to (schematically indicated) containers 3 comprises an unwinding device 4 for unwinding a label-backing tape 5 from a first or second supply reel 6, a processing device 7 for separating the label-backing tape 5 into the labels 2 and for transferring it to the containers 3, and a variable loop buffer 8 arranged in-between for temporarily storing the label-backing tape 5.

The loop buffer 8 comprises two deflecting pulleys 10 for the label-backing tape 5, which deflecting pulleys are mounted jointly on at least one pivoting lever 9 for changing the size of the loop buffer 8. Three stationarily-mounted deflecting pulleys 11 for the label-backing tape 5 are associated with the pivotably-mounted deflecting pulleys 10.

Figure 2:
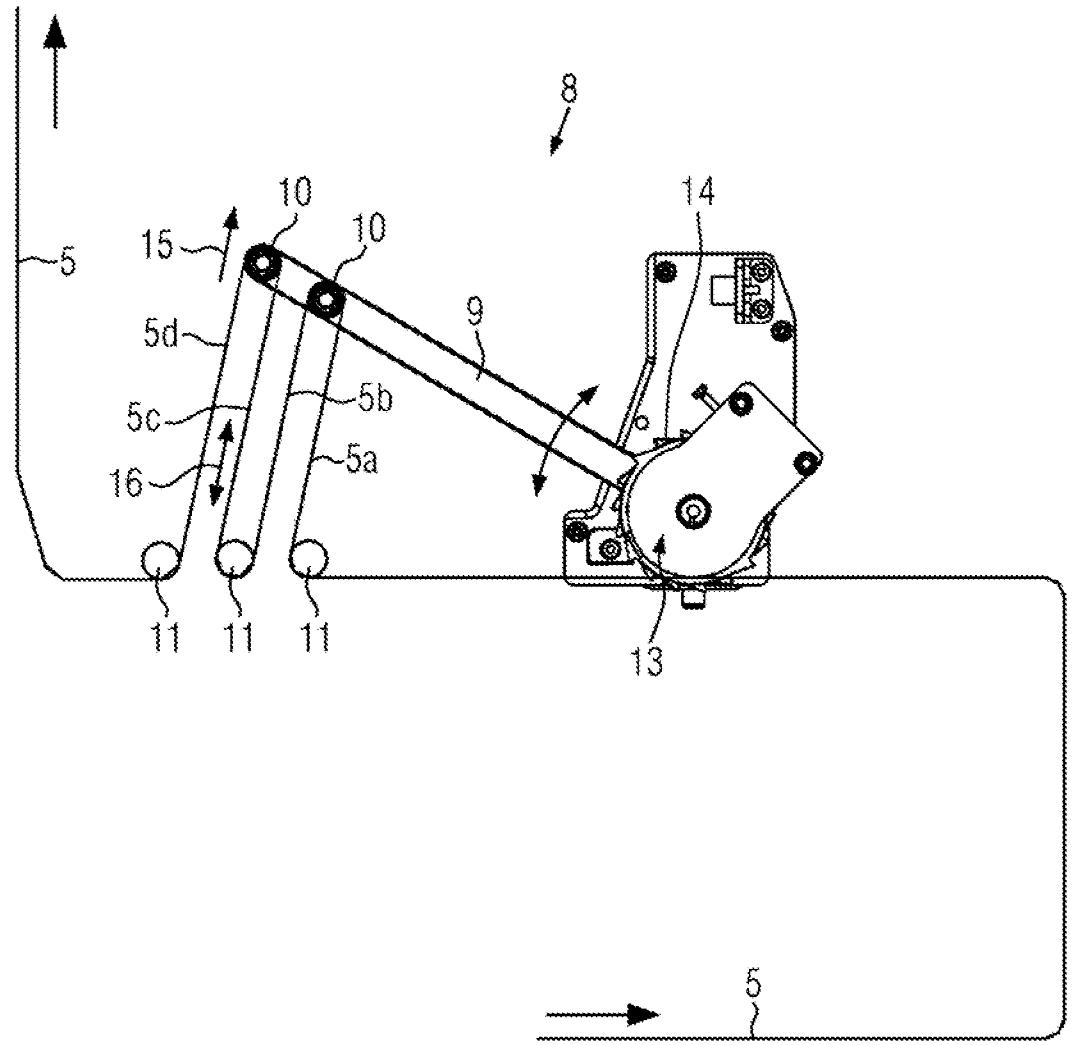
FIG. 2 is a plan view of the dynamic loop buffer.

As can be seen in detail in FIG. 2, the label-backing tape 5 between the pivotably-mounted deflecting pulleys 10 and the stationarily-mounted deflecting pulleys 11 of the loop buffer 8 forms four strands 5_a_ through 5_d_, the length of which, and thus also the configured size of the loop buffer 8, can be changed by pivoting the pivoting lever 9. In other words, the pivotable deflecting pulleys 10 are accordingly moved either away from or towards the stationary deflecting pulleys 11.

The loop buffer 8 comprises a spiral spring 13, which is covered in FIG. 2, and a ratchet 14, by means of which a preload 15 of the pivoting lever 9 can be set in a stepped manner according to the toothing of the ratchet 14. A strip tension 16 is thereby produced in the label-backing tape 5 when the labeling unit 1 is operating. The strip tension 16 is preferably defined/quantified for the region of the loop buffer 8.

Depending upon the change in the conveying speeds of the label-backing tape 5 upstream and downstream of the loop buffer 8, it can be filled with label-backing tape 5 in a manner known in principle using the preload 15, or label-backing tape 5 can be dispensed from the loop buffer 8 against the preload 15.

Figure 3:
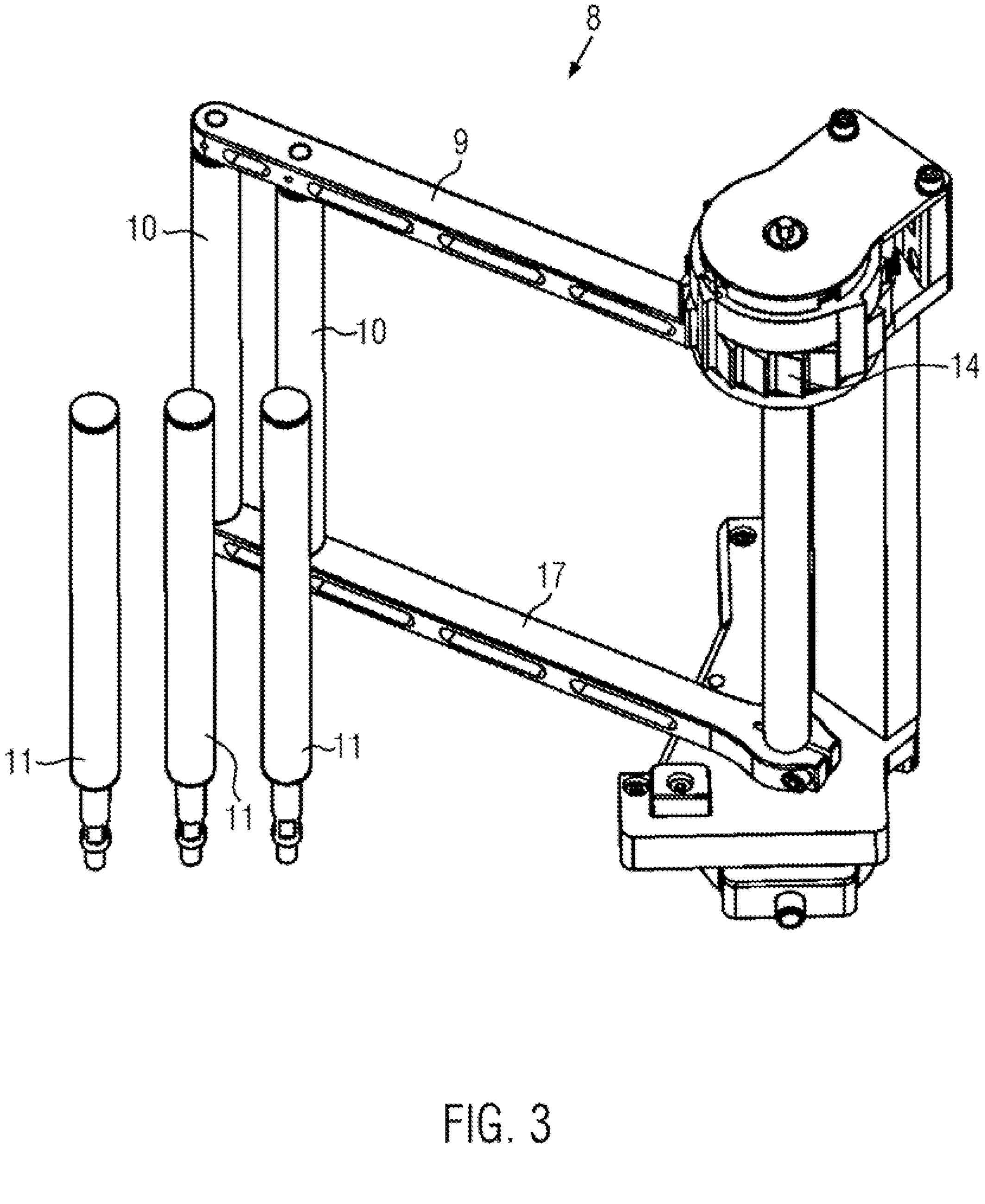
FIG. 3 is an oblique view of the loop buffer.

FIG. 3 shows that the deflecting pulleys 10 are preferably arranged between two, identically pivoting, pivoting levers 9, 17, and are mounted so as to be freely rotatable thereon. In principle, however, a mounting of the deflecting pulleys 10 on only one common pivoting lever 9, 17 would also be conceivable.

The at least one pivoting lever 9, 17 consists, for example, of aluminum or plastic, which enables a relatively low mass inertia when the loop buffer 8 is changed. Preferably, the at least one pivoting lever 9, 17 comprises openings and/or recesses for reducing the mass inertia. The pivoting lever 9, 17 could also be designed as a rod unit and/or tube or the like.

In order to reduce the mass inertia, the pivotable deflecting pulleys 10 preferably have a diameter 18 of at most 20 mm.

The relatively low mass inertia of the at least one pivoting lever 9, 17 and/or of the deflecting pulleys 10 makes it possible for the loop buffer 8 to react agilely to necessary size changes in the event of abrupt acceleration or deceleration of the label-backing tape 5.

Figure 4:
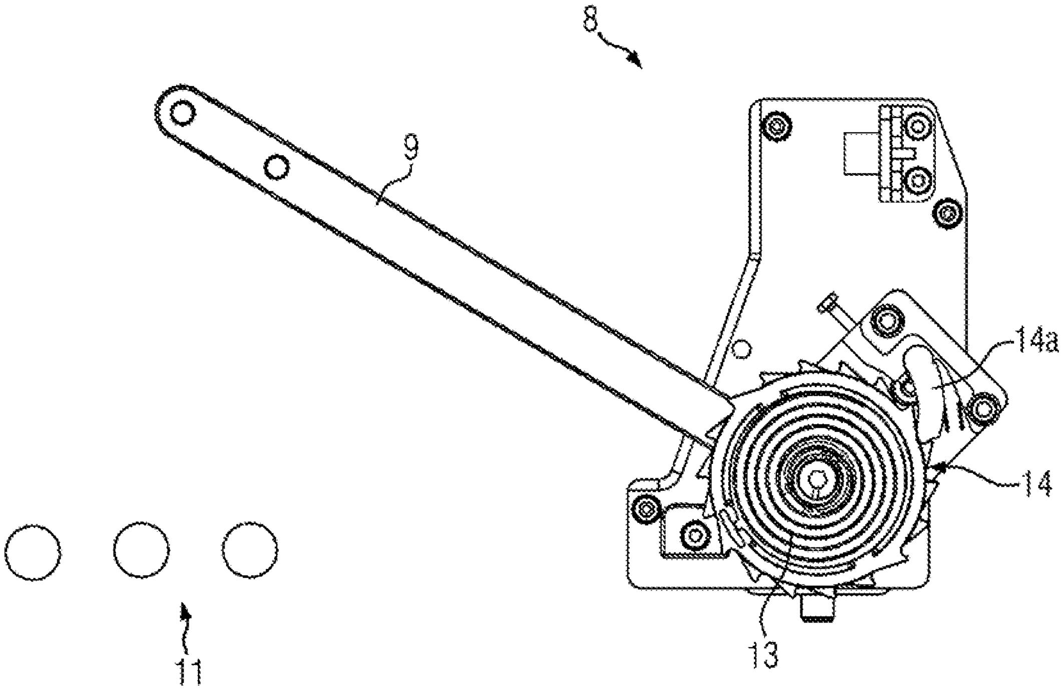
FIG. 4 is a horizontal section through the loop buffer.

FIG. 4 shows the coil spring 13, and also a latching lever 14*a*, which is present on the ratchet 14 and by means of which the increasing tension of the spiral spring 13 when rotated clockwise (plan view) is held in steps, and the preload 15 thus generated can thereby be mechanically adjusted. By folding down the latching lever 14*a*, the preload 15 can be reduced again in the reverse direction of rotation.

Instead of the spiral spring 13, at least one tension spring would in principle also be conceivable, which would then be fastened to the pivoting lever 9, 17 and could also be clamped in a suitable manner by means of a displaceable or pivotable stationary mechanism (not shown).

Figure 5:
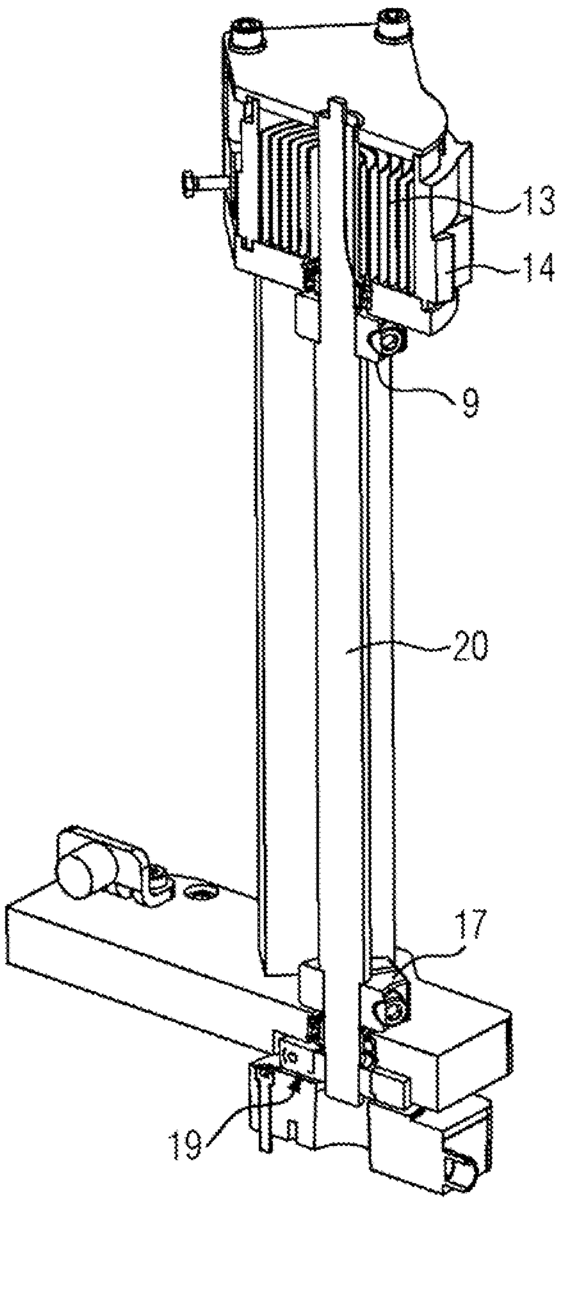
FIG. 5 is a vertical section through the loop buffer.

FIG. 5 also shows the spiral spring 13, and also shows a position encoder 19 with which the rotational position of a shaft 20 rigidly connecting the pivoting levers 9, 17 can be determined, in order to determine the angular position of the pivoting levers 9, 17 and thus the respectively set size of the loop buffer 8. This serves to allow monitoring—particularly before the connection of label-backing tapes 5. This ensures that a label-backing tape length sufficient for this is stored, which substantially corresponds to the sum of the strands 5*a* through 5*d* formed by the label-backing tape 5 in the loop buffer 8.

The number of pivotably-mounted deflecting pulleys 10 and the associated stationarily-mounted deflecting pulleys 11 could also be increased. For example, an embodiment is conceivable with three deflecting pulleys 10 mounted on at least one common pivoting lever 9, 17, and accordingly four associated stationarily-mounted deflecting pulleys 11.

FIG. 1 shows further components, known in principle, of the labeling unit 1, such as a connection unit 21 for connecting/splicing label-backing tapes 5 provided on the supply reels 6, an optional track control unit 22 and a conveyor roller 23 for the label-backing tape 5, and a vacuum cylinder 24 for transferring the labels 2 to the containers 3. A hot-gluing unit 25 as a component of the processing unit 7 can also be seen. In the embodiment shown, the loop buffer 8 is located by way of example downstream of the track control unit 22 and upstream of the conveyor roller 23. The conveyor roller 23 could also be integrated into the processing unit 7.

The filling level of the loop buffer 8 is here determined on the output side by the conveyor roller 23 and on the input side by the rotary drives of the unwinding unit 4 for the supply reels 6. These can in each case be designed as servo drives in a known manner. If the conveying speed of the conveyor roller 23 is higher than that of the unwinding unit 4, label-backing tape 5 is dispensed in the known manner, and vice versa.

FIG. 1 is a schematic representation of a labeling machine 30 comprising the labeling unit 1, with a container carousel 31 for the circulating transport of the containers 3. The mode of operation of the container carousel 31 and container plates present thereon, centering tulips or similar container receptacles in the sense of labeling positions of the container carousel 31 is known in principle and therefore not explained in detail in this connection.

The labeling unit 1 can be operated, for example, as follows:

During an ongoing labeling operation, the label-backing tape 5 is continuously unwound from one of the supply reels 6 and pulled through the loop buffer 8 to the processing device 7. There, the label-backing tape 5 is separated into labels 2 in a manner known in principle, transferred to the vacuum cylinder 24, and attached to the containers 3 by the latter.

The preload 15 of the loop buffer 8 is preferably set such that the resulting strip tension 16 is between 1 N and 5 N per strand 5*a*-5*d*, and in particular between 2 N and 4 N per strand.

For this purpose, the spiral spring 13 is tensioned by rotation of the ratchet 14. In this case, the ratchet 14 latches in stages, so that the ratchet 14 remains stationary after release in a latching position, and thereby provides a defined preload 15 in the loop buffer 8. By actuating the locking lever 14*a*, the ratchet 14 can be released, and the preload 15 can be reduced again.

The tension of the spiral spring 13 is thereby transmitted to each of the pivoting levers 9, 17, and the preload 15 is thereby set and maintained during labeling operation.

During an ongoing labeling operation, the size of the loop buffer 8 can be set such that suitable increases and reductions in the loop buffer 8 are possible upon accelerations or slow-downs of the label-backing tape 5. Such changes are possible in a comparatively agile manner due to the low mass inertia of the pivoting levers 9, 17 and the deflecting pulleys 10 fastened thereto. Likewise, sufficient label-backing tape length can be kept in the four strands 5*a* through 5*d* in order to compensate for a temporary interruption of the label-backing tape advancement through the supply reels 6 when the label-backing tapes 5 are connected.

This is advantageous, in particular, if the labeling unit 1 is integrated into a machine block (not shown), since the comparatively abrupt changes in speed that are then required in the strip transport of the label-backing tape 5 from the described loop buffer 8 are possible without damaging the label-backing tape 5, and with consistently reliable strip conveyance in the labeling unit 1.

In a machine block, the labeling machine 30 and the upstream machine, such as a blow-molding machine, and the downstream machine, such as a filling machine, are, as is known, in particular connected together without container buffers, by means of transfer stars or similar transport means, while maintaining or instituting a transport partitioning. Transport gaps in the container stream at which no label transfer takes place are then to be taken into account in the labeling unit 1—if necessary, by abrupt changes in the conveying speed of the label-backing tape 5. Similar requirements exist when starting up and shutting down the production plant. These changes in the conveying speed and the temporary storage during connection of label-backing tapes 5 can be managed in both a space-saving and material-saving manner by the described loop buffer 8.

Although the present disclosure has been described with various embodiments, various changes and modifications may be suggested to one skilled in the art. It is intended that the present disclosure encompass such changes and modifications as falling within the scope of the claims.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

The invention claimed is:

1. A labeling unit for applying labels to containers, comprising:

- an unwinding device for unwinding a label-backing tape from at least one supply reel;
- a separation unit for separating the label-backing tape into the labels and for transferring them onto the containers; and
- a loop buffer, arranged in-between the unwinding device and the separation unit,
- wherein the loop buffer is variable in size and is for temporarily storing the label-backing tape,
- wherein the loop buffer comprises deflecting pulleys for the label-backing tape, wherein the deflecting pulleys comprise at least two pivotably-mounted deflecting pulleys for changing the size of the loop buffer and stationarily-mounted deflecting pulleys working together with the at least two pivotably-mounted deflecting pulleys to form strands/loops of the label-backing tape, and
- wherein the loop buffer is designed and arranged to provide the sole, temporary storage between the supply reel and the separation unit.

2. The labeling unit of claim 1, wherein the at least two deflecting pulleys are mounted on at least one, shared, pivoting lever.

3. The labeling unit of claim 2, wherein the at least two deflecting pulleys have a diameter of, at most, 20 mm.

4. The labeling unit of claim 3, wherein the at least one pivoting lever is adjustably preloaded by means of at least one spring.

5. The labeling unit of claim 4, wherein the at least one spring is coupled to a ratchet for stepped, increasing preloading of the loop buffer.

6. The labeling unit of claim 4, wherein the loop buffer is designed to set a strip tension applied therein per strand of the label-backing tape in a range of 1 to 5 N.

7. The labeling unit of claim 6, wherein the loop buffer comprises a position encoder for determining a rotational position of the at least one pivoting lever and thus a current storage size.

8. The labeling unit of claim 1, wherein the loop buffer has a storage capacity for a label-backing tape length of at least 1 m.

9. A labeling machine for labeling containers, and in particular bottles, having a container carousel and the labeling unit of claim 1.

10. A machine block having the labeling machine of claim 9 and having at least one container-production or container-processing machine upstream or downstream thereof, without intermediate buffering.

11. A method for applying labels to containers in a labeling unit, the method comprising:

- unwinding a label-backing tape from a supply reel temporarily stored in a variable loop buffer;
- separating the label-backing tape into the labels using a separation unit; and
- transferring the labels to the containers,
- wherein the label-backing tape is guided in the variable loop buffer by at least two pivotably-mounted deflecting pulleys which are mounted so as to be pivotable for changing a size of the variable loop buffer, wherein strands/loops of the label-backing tape are formed in the variable loop buffer between the at least two pivotably-mounted deflecting pulleys and stationarily-mounted deflecting pulleys, and wherein a length of the label-backing tape guided between the supply reel and the separation unit is changed exclusively in the variable loop buffer.

12. The method of claim 11, further comprising setting a strip tension per strand of the label-backing tape to a value between 1 and 5 N in the variable loop buffer by a preload of at least one spring.

13. The method of claim 12, wherein the length of the label-backing tape conveyed for separation is kept exclusively in the variable loop buffer.

14. The method of claim 11, wherein the method is performed in a machine block, and wherein the containers to be labeled are transported from an upstream container-production or container-processing machine, and/or the labeled containers are transported to a downstream container-processing machine, without temporary storage.

15. The method according to claim 11, wherein the length of the label-backing tape conveyed for separation is kept exclusively in the variable loop buffer.

16. The method of claim 11, wherein the size of the variable loop buffer is changed by jointly pivoting the at least two deflecting pulleys.

17. The labeling unit of claim 4, wherein the at least one spring includes a spiral spring.

18. The labeling unit of claim 6, wherein the loop buffer is designed to set the strip tension applied therein per strand of the label-backing tape in a range of 2 to 4 N.

19. The labeling unit of claim 2, wherein the loop buffer comprises a position encoder for determining a rotational position of the at least one pivoting lever and thus a current storage size.

20. The labeling unit of claim 2, wherein the at least one pivoting lever is adjustably preloaded by means of at least one spring.

* * * * *